United States Patent [19]
Montgomery

[11] Patent Number: 5,763,337
[45] Date of Patent: Jun. 9, 1998

[54] FLUID IMPERVIOUS AND NON-SLIP FABRIC

[75] Inventor: Charles Daniel Montgomery, Valdosta, Ga.

[73] Assignee: Ludan Corporation, Valdosta, Ga.

[21] Appl. No.: 856,791

[22] Filed: May 15, 1997

Related U.S. Application Data

[63] Continuation of Ser. No. 350,527, Dec. 7, 1994, abandoned.

[51] Int. Cl.⁶ ..................................................... B32B 27/00
[52] U.S. Cl. ......................... 442/398; 36/59 R; 442/409; 442/62
[58] Field of Search ................... 36/45, 59 R; 442/398, 442/409, 62

[56] References Cited

U.S. PATENT DOCUMENTS

| | | | |
|---|---|---|---|
| 3,544,523 | 12/1970 | Maxion | 260/75 |
| 4,348,444 | 9/1982 | Craig | 428/137 |
| 4,348,445 | 9/1982 | Craig | 428/137 |
| 4,606,970 | 8/1986 | Sharps | 428/286 |
| 4,878,974 | 11/1989 | Kagawa | 156/85 |
| 5,169,712 | 12/1992 | Tapp | 428/315.5 |
| 5,298,694 | 3/1994 | Thompson | 181/286 |

*Primary Examiner*—James J. Bell
*Attorney, Agent, or Firm*—Trexler, Bushnell, Giangiorgi & Blackstone, Ltd.

[57] ABSTRACT

A fluid impervious and non-slip fabric is manufactured by thermally laminating a polyolefin film onto a non-woven fabric backing. The polyolefin film preferably comprises a polyblend of propylene copolymer and polyethylene. A shoe cover manufactured from the above laminated fabric has enhanced non-slip and fluid impervious properties.

22 Claims, 1 Drawing Sheet

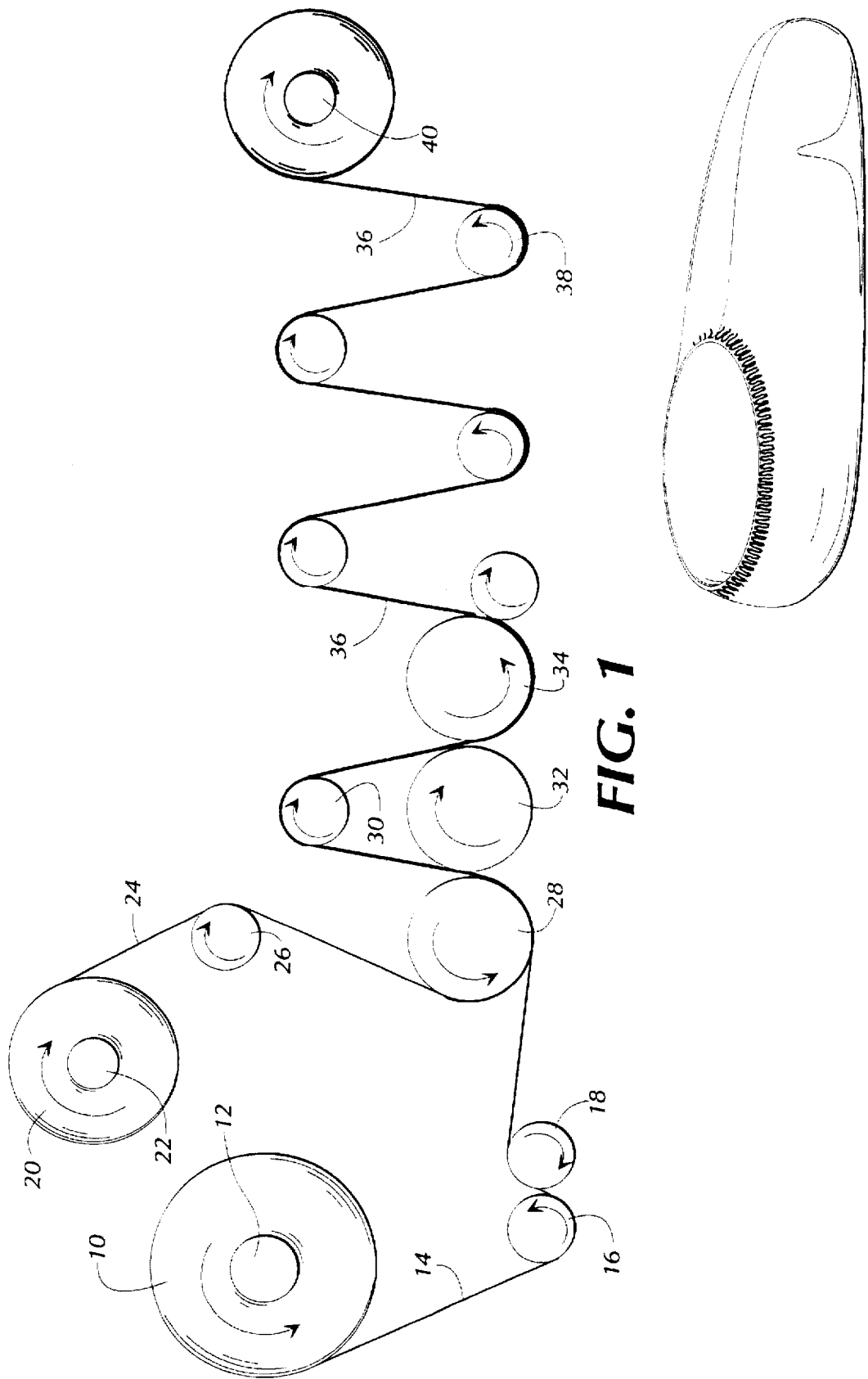

FLUID IMPERVIOUS AND NON-SLIP FABRIC

This application is continuation of U.S. patent application Ser. No. 08/350,527 filed Dec. 7, 1994 now abandoned.

FIELD OF THE INVENTION

The invention relates to a new fluid impervious and non-slip fabric which can be manufactured into a shoe cover for use in a medical or industrial clean room environment. More particularly, the invention relates to a new type of fabric and the method of manufacturing that fabric, wherein the fabric comprises a non-woven fabric backing having a polymer film thermally laminated thereon.

BACKGROUND OF THE INVENTION

Protective clothing is worn in many environments including medical environments, such as hospitals, and in clean rooms, such as for manufacturing facilities. In order to maintain their cleanliness, these environments often have highly polished slick floor surfaces which may be slippery, especially if wet.

Persons in these environments typically wear shoe covers, in addition to other protective clothing. Shoe covers typically now in use are simple shoe-shaped coverings sewn from a nonwoven fabric, such as spunbonded polyolefin. One problem with shoe covers currently used is that they are not impervious to liquids and if any liquids, such as body fluids, fall onto the shoe cover they will soak through the cover and onto the shoe or possibly the skin of the wearer. This presents an undesirable situation, with respect to body fluids as well as corrosive or dangerous chemicals. Another problem with shoe covers currently used is that they are extremely slippery on the slick polished floors common in hospitals and clean room environments.

Methods have been used to provide non-slip properties to shoe covers. However, the materials that have been manufactured for such purpose do not maintain their non-slip properties when used for a period of time. Laminated materials which have been used as shoe covers delaminate over time and come apart. This is undesirable not only because the shoe covers loose their anti-slip properties but also because small pieces of fabric may come off of the shoe cover and contaminate the environment. Another method that may be used to provide non-slip properties to shoe covers is to sew or laminate strips of non-skidding material across the bottoms of the shoe covers. However, this is a relatively expensive procedure and is not a desirable method for making disposable, single use, shoe covers.

Fabrics laminated with polymer films are not new. Typically, fabrics are laminated with polymer films using ultrasonic lamination, adhesive lamination or heat lamination. The use of both ultrasonic and adhesive lamination often results in inferior bonding or lamination of the film to the fabric, resulting in peeling off of the non-skid covering.

Accordingly, there exists a continuing and heretofore unaddressed need for an inexpensive disposable shoe cover that is impervious to liquids, resists skidding on a slippery floor, is economical to produce, and that does not delaminate or otherwise structurally degrade during use. It is to the provision of such a shoe cover and of the laminated fabric use to make such shoe covers that the present invention is primarily directed.

SUMMARY OF THE INVENTION

Briefly described, the present invention, in one preferred embodiment thereof, comprises a fluid impervious and non-slip laminated fabric and a method of making the fabric. Also, a novel non-skid fluid impervious shoe cover made from the fabric is taught. The laminated fabric is comprised of a polymer film sheet laminated onto and permanently bonded to a nonwoven polyolefin fabric backing sheet.

The polymer film is an extruded film sheet from a resin which comprises a propylene copolymer which may be blended with polyethylene. This film sheet is heated almost to its melting point whereupon it is thermally laminated to a sheet of non-woven fabric by applying pressure to the two layers. The nonwoven fabric is preferably nonwoven polypropylene such as spunbonded, melt blown, or needle-punch polypropylene.

The layer of polymer film and the layer of nonwoven fabric are laminated together by a two roller pressurized thermal lamination process. Essentially, the two layers pass between two parallel aligned rollers. The film encounters a heated teflon coated roller and the fabric encounters a rubber roller; the rubber roller is adjustable relative to the teflon coated roller and the two layers are pressed together so that the heated film laminates onto and bends with the fabric backing.

The laminated fabric made as above may be sewn into disposable, single use, shoe covers using a design which is known in the art. Other uses of the fabric are anticipated as well, such as disposable fluid impervious gowns and other protective clothing.

Thus, it is an object of the present invention to provide a fabric with improved liquid impermeability and non-slip properties.

Another object of the present invention is to provide a material suitable for manufacturing skid proof and fluid impervious shoe covers for use in hospital environments, clean rooms and the like.

A further object of the present invention is to provide for the economical manufacture of disposable, single use, shoe covers which are liquid impervious and skid resistant.

A still further object of the invention is to provide an improved material for use in manufacturing disposable protective clothing.

Other objects, features, and advantages of the present invention will become apparent upon reading the following specification, when taken in conjunction with the accompanying drawings.

BRIEF DESCRIPTION OF THE DRAWINGS

FIG. 1 is a schematic illustration of the laminated fabric manufacturing process of this invention showing the polymer film sheet, the nonwoven fabric backing sheet, and the pressure and heat applying rollers.

FIG. 2 is an illustrative view of a unique and improved shoe cover made from the laminated fabric of the invention.

DETAILED DESCRIPTION

FIG. 1 is a functional illustration of the process of making a laminated fabric that embodies principles of the present invention. The nonwoven fabric backing is supplied as a roll 10. This roll of fabric backing 10 is placed on a fabric unwind roller 12, which rotates to deliver a single sheet of fabric backing 14 to two oppositely rotating delivery rollers 16 and 18. The fabric backing preferably is a nonwoven polymer fabric such as spunbonded polypropylene, melt blown polypropylene, or needle punch polypropylene. These nonwoven fabrics are commonly used in the disposable apparel industry and particularly in the manufacturing of disposable clean room and hospital clothing. The fabric backing has a weight of about 0.75 to 0.8 ounces per square yard and may have a smooth or an embossed surface.

A roll of polymer film 20 is placed on the film unwind roller 22. The film unwind roller 22 rotates so as to deliver a single layer of film 24 to a preheat roller 26. The polymer film preferably is an extruded film comprising a propylene copolymer. The film may comprise 10–100% propylene copolymer but is, for economical reasons, preferably generally about 15–20% propylene copolymer. However, if a softer more pliable final material is preferred, a larger amount of propylene copolymer should be used. The polymer film is preferably a polyblend of the propylene copolymer and low density polyethylene or linear low density polyethylene. The other polymeric component of the propylene copolymer is most preferably ethylene but may be other olefins such as butene. The polymer film has a thickness of from about 0.4 to 1.0 millimeter and is most preferably at about 0.5 millimeter.

To keep the film from sticking to itself, a mineral filler such as calcium carbonate or talc may be included in the polyblend from about 15 to 25% by weight. To impart a whitish color to the film, titanium dioxide may be added to the polyblend in an amount of from about 5 to 10% by weight.

The preheat roller 26 is maintained at a temperature of about 200° to 250° F. by means of circulating hot oil or the like through the roller. The heated film sheet 24 is delivered to a roller 28 where it mates with the single layer of fabric backing 14. The two layers wrap around an upper roller 30 and then pass between a rubber roller 32 and a teflon coated heated roller 34. The two layers pass between the rubber roller 32 and the heated roller 34 such that the nonwoven fabric backing sheet is adjacent to the rubber roller 32 and the film sheet is adjacent to the heated roller 34. The teflon coated roller 34 is heated by hot oil circulation to a temperature of approximately 370° to 400° F. The temperature of the heated roller and the length of time the film sheet is in contact with the heated roller must be controlled so the film sheet effectively laminates onto the fabric backing sheet. Effective bonding of the materials is achieved if the materials are passed through the rollers at a speed of about 80 to 100 feet per minute.

Rubber roller 32 can be adjusted relative to heated roller 34 so that the two layers are pressed together as they pass between rubber roller 32 and heated roller 34. The pressurized mating of the single layer of fabric backing 14 and the heated single layer of film 24 causes the film 24 to laminate onto the fabric backing 14, thus creating a single sheet of laminated fabric 36.

The heated roller 34 may be embossed such that an embossed laminated fabric is produced. The single sheet of laminated fabric 36 passes over an array of rollers and through a trimmer 38 whereupon the edges of the fabric are trimmed off. The sheet of laminated fabric 36 is then wound upon a collection roller 40.

The above process creates a single sheet of laminated fabric which is fluid impervious and has non-slip properties. One application of the invented laminated fabric is in the manufacture of non-slip shoe covers. As shown in FIG. 2, the shoe covers are manufactured in essentially the same design as previous shoe covers but using the laminated fabric of the present invention. The outside of the shoe cover corresponds to the film sheet side of the laminated fabric. Alternatively, they may be manufactured using any desired process now know or to be discovered. A shoe cover prepared with the laminated fabric of the present invention has substantially enhanced non-slip properties on slick floors such as in hospitals and in clean room environments. In addition to shoe covers, the laminated fabric of this invention can be used to fabricate any number of finished products where an impervious, non-slip, disposable item is called for. Thus, even though a shoe cover is the preferred application of this fabric, this should not be interpreted as a limitation of the invention.

While a preferred embodiment has been disclosed in detail in the foregoing description and drawings, it will be understood by those skilled in the art that variations and modifications thereof can be made without departing from the spirit or scope of the invention as set forth in the following claims.

What is claimed is:

1. A fabric suitable for shoe coverings and similar items comprising:

a backing sheet of thin, continuous, nonwoven, polymer material having a weight of about 0.75 to 0.8 ounces per square yard;

a thin film sheet thermally laminated onto one side of said backing sheet;

said film sheet comprised of from about 10 to 100% propylene copolymer, wherein said polymer material from which said backing sheet is formed includes a polymer of propylene and said backing sheet and said film sheet are thermally laminated together to form said fabric, said fabric being thin, completely fluid impervious and non-slip and having a strong bond between said sheets such that said film sheet is substantially deterred from delaminating from said backing sheet.

2. The fabric of claim 1 wherein said film sheet comprises from about 15 to 20% by weight propylene copolymer.

3. The fabric of claim 1 wherein said film sheet further comprises polyethylene.

4. The fabric of claim 3 wherein said polyethylene is low density polyethylene or linear low density polyethylene.

5. The fabric of claim 1 wherein said film sheet further comprises from about 15 to 25% by weight calcium carbonate.

6. The fabric of claim 1 wherein said film sheet further comprises from about 15 to 25% by weight talc.

7. The fabric of claim 1 wherein said film sheet further comprises from about 5 to 10% by weight titanium dioxide.

8. The fabric of claim 1 wherein said nonwoven material is a fabric selected from the group consisting of spunbonded polypropylene, melt blown polypropylene, and needle punch polypropylene.

9. The fabric of claim 1 wherein said propylene copolymer is a copolymer of propylene and an olefin selected from the group consisting of ethylene and butene.

10. A single use disposable item of clothing manufactured from the fabric of claim 1, wherein the outside of said item of clothing corresponds to the film sheet side of said laminated fabric.

11. A single use disposable item of clothing as claimed in claim 10 and wherein said item of clothing comprises a shoe cover.

12. The fabric of claim 1, wherein said nonwoven material is comprised of spunbonded polypropylene.

13. The fabric of claim 9, wherein said nonwoven material is a fabric selected from the group consisting of spunbonded polypropylene, melt blown polypropylene, and needle punch polypropylene.

14. The fabric of claim 1, wherein said film sheet is thermally laminated onto said one side of said backing sheet by heating said film sheet approximately to the copolymer's melting point and by applying pressure to the melted film sheet and said backing sheet to bond the sheets together.

15. The fabric of claim 14, wherein said film sheet is heated to approximately 370° F. to 400° F.

16. A single use, disposable item of clothing for a human body extremity such as a foot, said item having an interior and an exterior surface, with said exterior surface subject to coming into frictional contact with a slippery surface, and said item being formed from a fluid impervious and non-slip laminated fabric comprising: a backing sheet of thin, continuous, nonwoven, polymer material having a weight of about 0.75 to 0.8 ounces per square yard; a thin film sheet thermally laminated onto one side of said backing sheet, said film sheet comprised of from about 10 to 100% propylene copolymer, wherein said polymer material from which said backing sheet is formed includes a polymer of propylene and said backing sheet and said film sheet are thermally laminated together to form said fabric, said fabric being thin, completely fluid impervious and non-slip and having a strong bond between said sheets such that said film sheet is substantially deterred from delaminating from said backing sheet.

17. A fabric as defined in claim 16, wherein said item of clothing is a shoe covering.

18. A fabric as defined in claim 1, wherein said polymer of propylene comprises polypropylene.

19. An item of clothing as defined in claim 16, wherein said polymer of propylene comprises polypropylene.

20. A thin fabric shoe cover including at least a sole portion comprising a non-slip laminated fabric, said fabric including a thin, inner fluid permeable tear-resistant backing sheet having a weight of about 0.75 to 0.8 ounces per square yard and a thin outer fluid-impervious non-slip film sheet thermally bonded to said backing sheet, and said film sheet comprised of from about 10 to 100 percent substantially non-slip propylene copolymer.

21. A shoe cover as defined in claim 20, wherein said backing sheet has a composition comprising a polymer of propylene.

22. A shoe cover as defined in claim 20, wherein said backing sheet has a composition comprising polypropylene.

* * * * *